US010781918B2

(12) United States Patent
Kamio

(10) Patent No.: US 10,781,918 B2
(45) Date of Patent: Sep. 22, 2020

(54) SHIFT RANGE CONTROL DEVICE

(71) Applicant: DENSO CORPORATION, Kariya, Aichi-pref. (JP)

(72) Inventor: Shigeru Kamio, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/407,444

(22) Filed: May 9, 2019

(65) Prior Publication Data

US 2019/0264805 A1   Aug. 29, 2019

Related U.S. Application Data

(63) Continuation of application No. PCT/JP2018/022045, filed on Jun. 8, 2018.

(30) Foreign Application Priority Data

Jun. 16, 2017   (JP) .................................. 2017-118563

(51) Int. Cl.
| | | |
|---|---|---|
| F16H 61/02 | (2006.01) | |
| F16H 61/28 | (2006.01) | |
| F16H 61/24 | (2006.01) | |
| F16H 61/32 | (2006.01) | |
| F16H 59/08 | (2006.01) | |
| F16H 63/38 | (2006.01) | |

(52) U.S. Cl.
CPC ............. *F16H 61/28* (2013.01); *F16H 59/08* (2013.01); *F16H 61/02* (2013.01); *F16H 61/24* (2013.01); *F16H 61/32* (2013.01); *F16H 63/38* (2013.01); *F16H 2061/247* (2013.01); *F16H 2061/2823* (2013.01); *F16H 2061/326* (2013.01)

(58) Field of Classification Search
CPC .......... F16H 59/08; F16H 61/02; F16H 61/28; F16H 2061/2823; F16H 2061/283; F16H 2061/32; F16H 2061/326
See application file for complete search history.

(56) References Cited

U.S. PATENT DOCUMENTS

| | | | |
|---|---|---|---|
| 7,511,444 B2 | 3/2009 | Nakai et al. | |
| 2001/0005816 A1* | 6/2001 | Kusafuka | F16H 61/32 702/96 |
| 2005/0156550 A1* | 7/2005 | Kamio | F16H 61/32 318/445 |
| 2009/0120222 A1* | 5/2009 | Kimura | F16H 61/32 74/335 |
| 2009/0292431 A1* | 11/2009 | Hoshino | F16H 61/12 701/62 |
| 2018/0115262 A1 | 4/2018 | Kamio | |

* cited by examiner

*Primary Examiner* — Edwin A Young
(74) *Attorney, Agent, or Firm* — Nixon & Vanderhye P.C.

(57) ABSTRACT

A shift range control device includes an angle calculation unit, a target angle setting unit, a learning unit and a drive control unit. The learning unit learns a correction value to be used in calculating a motor angle target value based on a motor angle and an output shaft signal. The learning unit learns the correction value based on at least a first change point value, which is the motor angle at a timing at which the output shaft signal changes when a rotation member rotates in a first direction from a state in which an engagement member is in the center of valley section, and/or a second change point value, which is the motor angle at a timing at which the output shaft signal changes when the rotation member rotates in a second direction from a state in which the engagement member is in the center of the valley section.

10 Claims, 5 Drawing Sheets

SHIFT RANGE CONTROL DEVICE

CROSS-REFERENCE TO RELATED APPLICATIONS

The present application is a continuation application of International Patent Application No. PCT/JP2018/022045 filed on Jun. 8, 2018, which designated the U.S. and claims the benefit of the priority from Japanese Patent Application No. 2017-118563 filed on Jun. 16, 2017. The entire disclosures of all of the above applications are incorporated herein by reference.

FIELD

The present disclosure relates to a shift range control device.

BACKGROUND

Conventionally, a shift range switching device, which switches a shift range by controlling a motor in accordance with a shift range switching request from a driver, is known. For example, an output shaft sensor is provided to detect a rotation angle of an output shaft firmly fitted and coupled to a rotation shaft of a speed reduction mechanism that transmits rotation of a motor after speed reduction.

SUMMARY

A shift range control device according to the present disclosure switches a shift range by controlling drive of a motor in a shift range switching system. The shift range switching system includes a motor, a rotation member, an engagement member, a rotation angle sensor and an output shaft sensor. The rotation member has plural valley sections and ridge sections between the valley sections and rotates integrally with an output shaft to which rotation of the motor is transmitted. The engagement member is engageable with the valley section corresponding to the shift range. The motor rotation angle sensor outputs a motor rotation angle signal corresponding to a rotation position of the motor. The output shaft sensor outputs an output shaft signal corresponding to a rotation position of the output shaft.

BRIEF DESCRIPTION OF THE DRAWINGS

The above and other objects, features and advantages of the present disclosure will become more apparent from the following detailed description taken in conjunction with the accompanying drawings. In the drawings.

EMBODIMENT FOR CARRYING OUT THE INVENTION

Embodiment

Figure 1:
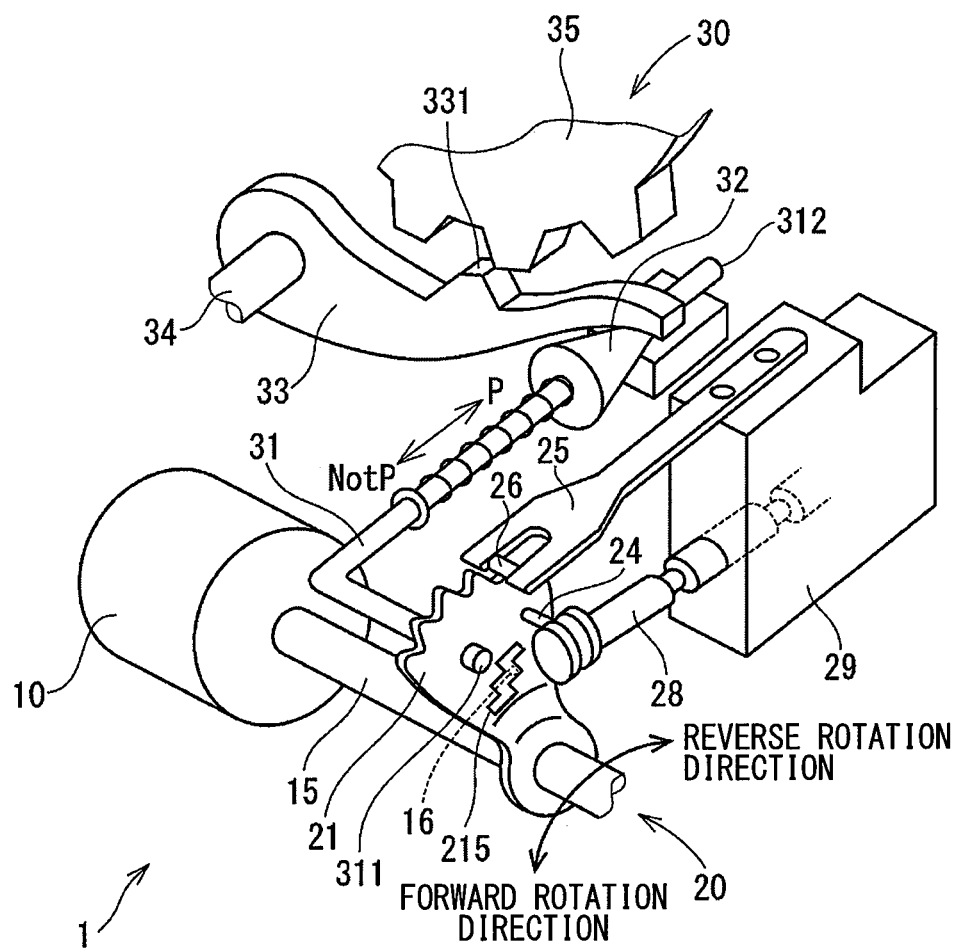
FIG. 1 is a perspective view showing a shift-by-wire system according to one embodiment.
Figure 2:
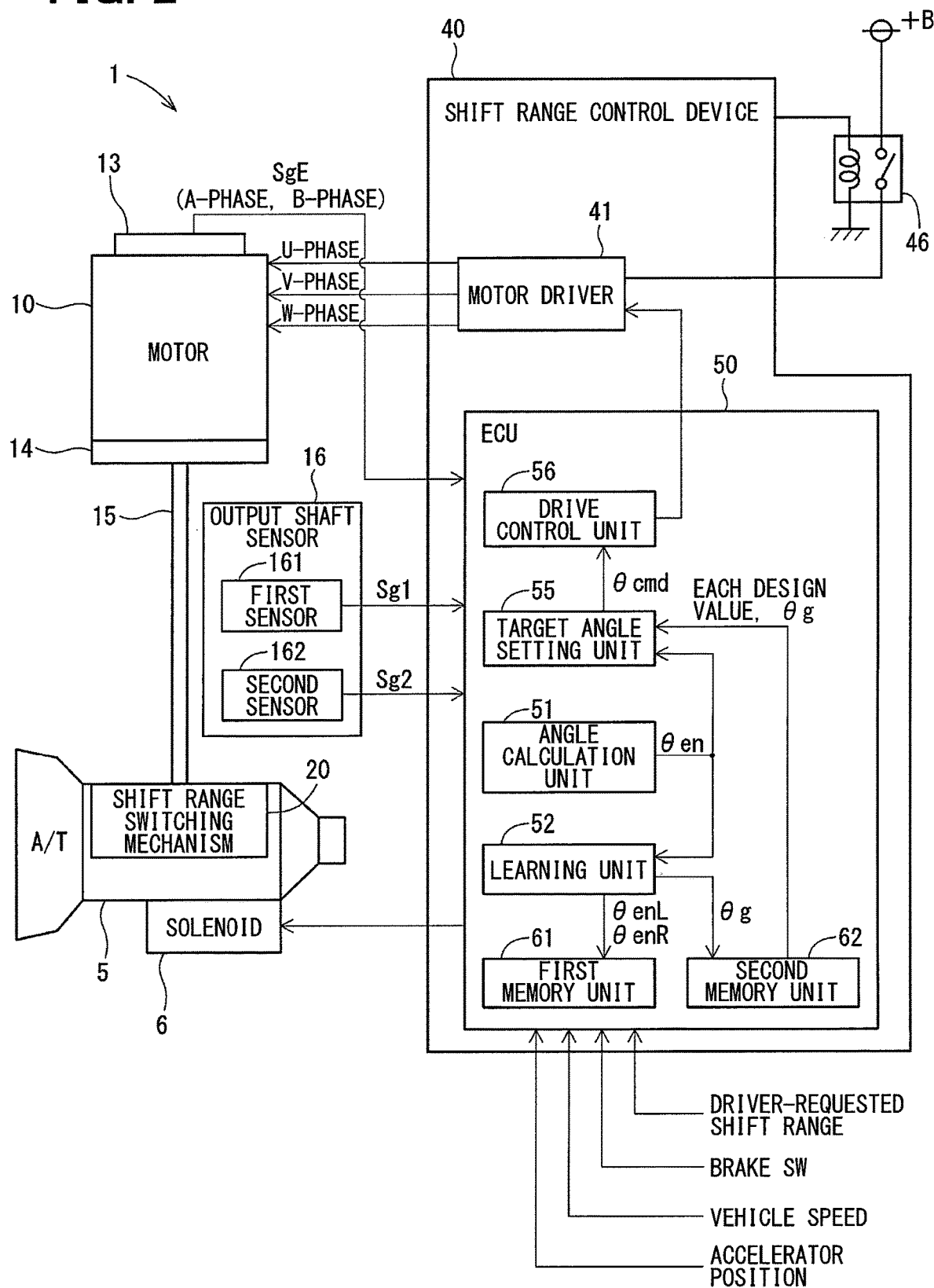
FIG. 2 is a block diagram showing a general configuration of the shift-by-wire system according to the embodiment.

A shift range control device will be hereinafter described with reference to the drawings. As shown in FIG. 1 and FIG. 2, a shift-by-wire system 1 as a shift range switching device includes a motor 10, a shift range switching mechanism 20, a parking lock mechanism 30, a shift range control device 40 and the like. The motor 10 is rotated by power supplied from a battery which is installed in the vehicle (not shown) and functions as a drive source of the shift range switching mechanism 20. The motor 10 of the present embodiment is a permanent magnet type DC brushless motor.

As shown in FIG. 2, an encoder 13 detects, as a motor rotation angle sensor, a rotation position of a rotor (not shown) of the motor 10. The encoder 13 is a magnetic type rotary encoder and includes a magnet rotating with a rotor, a Hall IC for detecting magnetic field or the like. The encoder 13 outputs A-phase and B-phase pulse signals for each predetermined angle in synchronism with the rotation of the rotor. Hereinafter, the signal from the encoder 13 is referred to as a motor rotation angle signal SgE. In the present embodiment, the encoder 13 is configured as a single system that outputs one signal each for the A phase and the B phase. In the present embodiment, the encoder 13 has higher angle detection accuracy than the output shaft sensor 16. A speed reducer 14 is provided between the motor shaft 105 (refer to FIG. 3) of the motor 10 and an output shaft 15. The speed reducer 14 reduces the rotation of the motor 10 and outputs the rotation of the motor 10 to the output shaft 15. The rotation of the motor 10 is thus transmitted to the shift range switching mechanism 20.

The output shaft sensor 16 has a first sensor unit 161 and a second sensor unit 162, and detects the rotation position of the output shaft 15. The output shaft sensor 16 according to the present embodiment is a magnetic sensor that detects a change in the magnetic field of a target 215 (refer to FIG. 1) provided on a detent plate 21 as a rotating member described later. The output shaft sensor 16 is attached to a position where the magnetic field of the target 215 is detectable. In the figure, the first sensor unit 161 is labeled as a first sensor and the second sensor unit 162 is labeled as a second sensor.

The sensor units 161 and 162 are so-called MR sensors having magnetoresistive elements (MR elements), which detect changes in the magnetic field of the target 215. The first sensor unit 161 detects a magnetic field corresponding to the rotation position of the target 215, and outputs the output shaft signal Sg1 to the ECU 50. The second sensor unit 162 detects a magnetic field corresponding to the rotation position of the target 215, and outputs the output shaft signal Sg2 to the ECU 50. The output shaft sensor 16 of the present embodiment includes two sensor units 161 and 162, and independently transmits the output shaft signals Sg1 and Sg2 to the ECU 50. That is, the output shaft sensor 16 has a double system.

In the present embodiment, the output shaft sensor 16 is a magnetic sensor that detects a change in the magnetic field of the target 215 in a contactless manner. Thereby, as compared with a contact type sensor, the output shaft signals Sg1 and Sg2 can be easily multiplexed without largely changing the configuration on the actuator side. The output shaft signals Sg1 and Sg2 can be suitably used for abnormality monitoring such as diagnosis and failsafe operation of the shift-by-wire system 1 because the output shaft signals Sg1 and Sg2 can meet a request for relatively high safety by multiplexing (in the present embodiment, doubling) the output shaft signals Sg1 and Sg2.

As shown in FIG. 1, the shift range switching mechanism 20 includes a detent plate 21, a detent spring 25 and the like. The shift range switching mechanism 20 transmits the rotational drive force output from the speed reducer 14 to a manual valve 28 and a parking lock mechanism 30. The detent plate 21 is fixed to the output shaft 15 and rotates integrally with the output shaft 15 when the motor 10 is driven.

The detent plate 21 has a pin 24 protruding in parallel with the output shaft 15. The pin 24 is connected to the manual valve 28. As the detent plate 21 is driven by the motor 10, the manual valve 28 reciprocates in the axial direction. That is, the shift range switching mechanism 20 converts the rotational motion of the motor 10 to the linear movement and transmits it to the manual valve 28. The manual valve 28 is provided to a valve body 29. The reciprocating movement in the axial direction of the manual valve 28 switches hydraulic pressure supply paths to a hydraulic clutch (not shown) to switch the engaged state of the hydraulic clutch, so that the shift range is switched.

Figure 3:
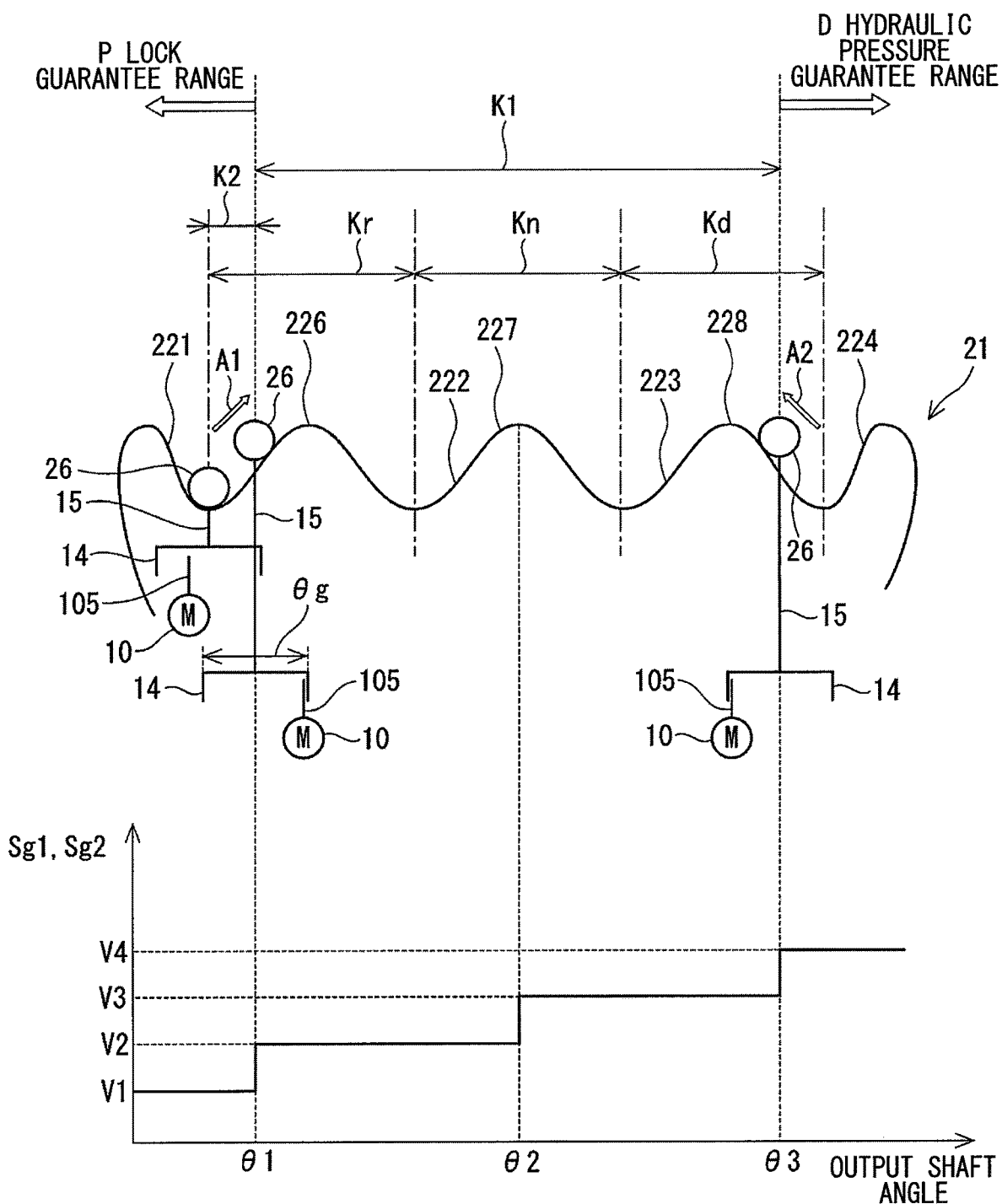
FIG. 3 is an explanatory view showing learning of rattle width based on an output shaft signal according to the embodiment.

As schematically shown in FIG. 3, four valley sections 221 to 224 are provided on the detent spring 25 side of the detent plate 21. Specifically, a first valley section 221, a second valley section 222, a third valley section 223 and a fourth valley section 224 correspond to a P range, an R range, an N range and a D range, respectively. Also, a first ridge section 226, a second ridge section 227 and a third ridge section 228 are provided between the first valley section 221 and the second valley section 222, between the second valley section 222 and the third valley section 223 and between the third valley section 223 and the fourth valley section 224, respectively. In FIG. 3, a one-dot chain line indicates a center position of each valley section 221 to 224.

Here, focusing on the first ridge section 226, the first valley section 221 corresponds to the "P range side ridge section" and the second valley section 222 corresponds to the "counter P range side ridge section". Focusing on the second ridge section 227, the second valley section 222 corresponds to the "P range side valley section" and the third valley section 223 corresponds to the "counter P range side valley section." Focusing on the third ridge section 228, the third valley section 223 corresponds to the "P range side valley section" and the fourth valley section 224 corresponds to the "counter P range side valley section."

As shown in FIG. 1, the detent plate 21 is provided with the target 215 whose magnetic field changes according to the rotation of the output shaft 15. The target 215 is formed of a magnetic material. The target 215 may be a separate member from the detent plate 21. Alternatively, the detent plate 21 may be formed by pressing, for example. in case that the detent plate 21 is a magnetic material. The target 215 is formed such that output voltages, which are the output shaft signals Sg1 and Sg2 of the output shaft sensor 16, change stepwise in accordance with the rotation position of the output shaft 15. Details of the output shaft signals Sg1 and Sg2 will be described later.

The detent spring 25 is a resiliently deformable plate-like member provided with a detent roller 26 at a tip end. The detent roller 26 is an engagement member. The detent roller 26 fits into one of the valley sections 211 to 214. In the present embodiment, since the number of valley sections 221 to 224 formed in the detent plate 21 is four, the number of engagement positions in which the detent roller 26 engages is four.

The detent spring 25 presses the detent roller 26 toward the rotation center of the detent plate 21. When a rotational force equal to or larger than a predetermined level is applied to the detent plate 21, the detent spring 25 is deformed resiliently to enable the detent roller 26 to move among the valley sections 221 to 224. When the detent roller 26 fits into one of the valley sections 221 to 224, pivotal movement of the detent plate 21 is restricted. In this way, the axial position of the manual valve 28 and the state of the parking lock mechanism 30 are determined and the shift range of the automatic transmission 5 is fixed.

The parking lock mechanism 30 includes a parking rod 31, a conical member 32, a parking lock pawl 33, a shaft 34 and a parking gear 35. The parking rod 31 is generally L-shaped, and one end 311 side is fixed to the detent plate 21. The conical member 32 is provided to the other end 312 side of the parking rod 31. The conical member 32 is formed so as to contract toward the other end 312 side. When the detent plate 21 pivots in a reverse rotation direction, the conical member 32 moves toward a direction of an arrow P.

The parking lock pawl 33 is provided to abut on a conical surface of the conical member 32 and pivot around the shaft 34. On the parking gear 35 side in the parking lock pawl 33, the parking lock pawl 33 has a protrusion 331 that can mesh with the parking gear 35. When the detent plate 21 rotates in the reverse rotation direction and the conical member 32 moves in the direction of arrow P, the parking lock pawl 33 is pushed up so that the protrusion 331 meshes with the parking gear 35. By contrast, when the detent plate 21 rotates in the forward rotation direction and the conical member 32 moves in the direction of arrow "NotP," the protrusion 331 is released from meshing with the parking gear 35.

The parking gear 35 is placed at an axle (not shown) so as to be capable of meshing with the protrusion 331 of the parking lock pawl 33. The parking gear 35 meshing with the protrusion 331 restricts the rotation of the axle. When the shift range is the NotP range, which is one of the ranges other than the P range, the parking gear 35 is not locked by the parking lock pawl 33 and the rotation of the axle is not restricted by the parking lock mechanism 30. When the shift range is the P range, the parking gear 35 is locked by the parking lock pawl 33 and the rotation of the axle is restricted.

As shown in FIG. 2, the shift range control device 40 includes a motor driver 41, an ECU 50 and the like. The motor driver 41 outputs a drive signal related to energization of each phase (U-phase, V-phase, W-phase) of the motor 10. A motor relay 46 is provided between the motor driver 41 and a battery. The motor relay 46 is turned on when a start switch of a vehicle, such as an ignition switch or the like, is turned on, so that power is supplied to the motor 10. The motor relay 46 is turned off when the start switch is turned off, so that power supply to the motor 10 is shut down.

An ECU 50 is mainly composed of a microcomputer or the like, and internally includes, although not shown, a CPU, a ROM, a RAM, an I/O, a bus line for connecting these components, and the like. Each processing executed by the ECU 50 may be software processing or may be hardware processing. The software processing may be implemented by causing the CPU to execute a program. The program may be stored beforehand in a memory device such as a ROM, that is, in a readable non-transitory tangible storage medium. The hardware processing may be implemented by a special purpose electronic circuit.

The ECU 50 controls the switching of the shift range by controlling the drive of the motor 10 based on a driver-requested shift range, a signal from a brake switch, a vehicle speed and the like. The ECU 50 controls the drive of a transmission hydraulic control solenoid 6 based on the vehicle speed, accelerator position, driver-requested shift range and the like. By controlling the transmission hydraulic control solenoid 6, the shift stage is controlled. The transmission hydraulic control solenoid 6 is provided in number in correspondence to the number of the shift ranges and the like. In the present embodiment, one ECU 50 controls the drive of the motor 10 and the solenoid 6. However, the ECU 50 may be divided into a motor ECU for motor control and an AT-ECU for solenoid control. Hereinafter, a drive control for the motor 10 will be mainly explained.

The ECU 50 includes an angle calculation unit 51, a learning unit 52, a target angle setting unit 55, a drive control unit 56, a first storage unit 61, a second storage unit 62 and the like. These units 51, 52, 55 and 56 correspond to angle calculation processing, learning processing, target angle setting processing and drive control processing, respectively, which are executed by the microcomputer based on control programs. The angle calculation unit 51 calculates an encoder count value θen which is a count value of the encoder 13 based on the motor rotation angle signal SgE output from the encoder 13. The encoder count value θen is a value which corresponds to actual mechanical angle and electrical angle of the motor 10. In the present embodiment, the encoder count value θen corresponds to the "motor angle."

The learning unit 52 calculates a rattle width θg based on the encoder count value θen and the output shaft signals Sg1 and Sg2. The target angle setting unit 55 sets a target shift range based on the driver-requested shift range based on a shift switch or the like, the vehicle speed, the signal from the brake switch and the like. Further, the target angle setting unit 55 sets a target count value θcmd, which is a motor angle target value, according to the target shift range. The drive control unit 56 controls the drive of the motor 10 by feedback control or the like so that the motor 10 is stopped at the rotation position where the encoder count value θen becomes the target count value θcmd. Details of the motor drive control for the motor 10 are not limited in particular.

The first storage unit 61 is, for example, a volatile memory such as a RAM. Electric power is supplied to the first storage unit 61 via the start switch. Therefore, the information stored in the first storage unit 61 is erased when the start switch is turned off. The second storage unit 62 is, for example, a volatile memory such as an SRAM. Power is directly supplied to the second storage unit 62 from the battery directly without passing through the start switch. Therefore, the information stored in the second storage unit 62 is not erased even when the start switch is turned off but erased when the battery is disconnected. As the second storage unit 62, for example, a non-volatile memory such as an EEPROM may be used.

FIG. 3 schematically shows the detent plate 21 and the like in the upper part, and the output shaft signals Sg1 and Sg2 in the lower part. An angle design value Kr between centers of the valley sections 221 and 222, an angle design value Kn between centers of the valley sections 222 and 223 and an angle design value Kd between centers of the valley sections 223 and 224, which are shown in FIG. 3, are stored in advance in the ROM (not shown) or the like. In addition, an angle design value K1 between angles θ1 and θ3 described later at which the output shaft signals Sg1 and Sg2 change, and an angle design value K2 between the angle θ1 at which the output shaft signals Sg1 and Sg2 change and the center of the first valley section 221 is also stored in advance in the ROM or the like. In the present embodiment, the angle design values Kn, Kr, Kd, K1 and K2 are all values, which correspond to the count value of the encoder 13, but may be any value that can be converted into angles.

The output shaft angle θs is an angle corresponding to the rotation position of the output shaft 15. This angle is θ1 when the detent roller 26 is at a predetermined position between the first valley section 221 and the first ridge section 226. This angle is θ2 when the detent roller 26 is located at a top of the second ridge section 227. This angle is θ3 when the detent roller 26 is at a predetermined position between the third ridge section 228 and the fourth valley section 224. In the present embodiment, the angle θ1 is set in the same manner as a boundary value of a P lock guarantee range that guarantees the parking lock by the parking lock mechanism 30. Further, the angle θ3 is set in the same manner as a boundary value of a D hydraulic pressure guarantee range which guarantees the hydraulic pressure of the drive range in the automatic transmission 5.

When the output shaft angle θs is smaller than the angle θ1, the output shaft signals Sg1 and Sg2 are constant at a value V1. When the output shaft angle θs becomes the angle θ1, the output shaft signals Sg1 and Sg2 change from the value V1 to a value V2. The output shaft signals Sg1 and Sg2 are constant at the value V2 in a range where the output shaft angle θs is equal to or larger than the angle θ1 and smaller than the angle θ2. When the output shaft angle θs becomes the angle θ2, the output shaft signals Sg1 and Sg2 change from the value V2 to a value V3. The output shaft signals Sg1 and Sg2 are constant at the value V3 in a range where the output shaft angle θs is equal to or larger than the angle θ2 and smaller than an angle θ3. When the output shaft angle θs becomes the angle θ3, the output shaft signals Sg1 and Sg2 change to a value V4. When the output shaft angle θs is equal to or larger than the angle θ3, the output shaft signals Sg1 and Sg2 are constant at the value V4.

The values V1, V2, V3 and V4 to which the output shaft signals Sg1 and Sg2 change possibly are discrete and not an intermediate value of each value. Further, a difference between the value V1 and the value V2, a difference between the value V2 and the value V3, and a difference between the value V3 and the value V4 are set to be a sufficiently large value as compared with the resolution and the sensor error. That is, in the present embodiment, the switching of the value from the first value to the second value, which differs to such an extent that it cannot be regarded as a continuous value in the movement among the valley sections 221 to 224 of the detent roller 26, is referred to as "a stepwise change." The differences between the value V1 and the value V2, between the value V2 and the value V3 and between the value V3 and the value V4 may be equal or different one another. In the present embodiment, the values are assumed to be in a magnitude relation V1<V2<V3<V4, but this magnitude relationship of the values V1 to V4 may be different.

In the present embodiment, the number of engagement positions of the detent roller 26 is four. The output shaft sensor 16 and the target 215 are provided so that the output shaft signals Sg1 and Sg2 change in four steps according to the engagement position of the detent roller 26. That is, in the present embodiment, the number of engagement positions and the number of steps of the output voltages that can be taken by the output shaft signals Sg1 and Sg2 coincide with each other. For example, in case that the output shaft signal is an analog signal that changes continuously according to the rotational position of the output shaft 15 as a reference example, processing such as AD conversion is required. In the present embodiment, the output shaft signals Sg1 and Sg2 change stepwise according to the shift range. In case that the output shaft signals Sg1 and Sg2 have about four steps, processing such as AD conversion in the output shaft sensor 16 becomes unnecessary, so the configuration of the output shaft sensor 16 can be simplified.

In the illustration provided in the upper part of FIG. 3, "play" between the motor shaft 105 and the output shaft 15 is conceptually shown. Here, illustration is made on an assumption that the output shaft 15 and the speed reducer 14 are integrated with each other and that the motor shaft 105 is movable within the play range of the speed reducer 14. However, the motor shaft 105 and the speed reducer 14 may be integrated with each other and the play exists between the speed reducer 14 and the output shaft 15. Here, the play between the motor shaft and the output shaft is assumed to exist between the gear of the speed reducer 14 and the motor shaft 105. It is noted that the play may be regarded as a sum of plays, rattle and the like. Hereinafter, the total of the play between the motor shaft 105 and the output shaft 15 is referred to as a rattle width $\theta g$. In practice, the detent roller 26 moves between the valley sections 221 to 224 by the rotation of the detent plate 21 integrally with the output shaft 15. However, in FIG. 3, the detent roller 26 is illustrated assuming the integral rotation with the output shaft 15.

The speed reducer 14 is provided between the motor shaft 105 and the output shaft 15 and the play including gear backlash is present therebetween. In the present embodiment, the motor 10 is a DC brushless motor. Therefore, when the power is not supplied to the motor 10, the motor shaft 105 rotates within the play because of cogging torque, for example, and the motor shaft 105 and the output shaft 15 tend to be separated. In addition, when the power supply to the motor 10 is shut down at the position where the detent roller 26 is not in the center of the valley section 221 to 224, it is likely that the detent roller 26 cannot be pushed in the center of the valley section 221 to 224 by the spring force of the detent spring 25 properly because of the influence of the cogging torque. Therefore, in the present embodiment, the stop position of the motor 10 is controlled accurately by learning the rattle width $\theta g$ based on the output shaft signals Sg1, Sg2 and the encoder count value $\theta en$ and setting the target count value $\theta cmd$ using the rattle width $\theta g$.

Here, learning of the rattle width $\theta g$ will be described. In FIG. 3, the rotation direction for rotating the detent plate 21 so that the detent roller 26 moves in a direction of arrow A1 is referred to as a first direction, and the rotation direction for rotating the detent plate 21 in a direction of arrow A2 is referred to as a second direction.

When the start switch is off, the shift range is the P range, and the detent roller 26 is located at the center of the first valley section 221. At this time, the motor 10 is likely to rotate within the range of the rattle width $\theta g$ due to the cogging torque. It is thus difficult to specify immediately after the start at which position within the rattle width $\theta g$ the motor 10 is. When the target shift range is switched from the P range to a range other than the P range as indicated by the arrow A1, the detent roller 26 moves from the first valley section 221 to the first ridge section 226 side by the rotation of the detent plate 21. When the detent roller 26 passes through the center of the first valley section 221 and is in a so-called hill climbing state, the motor shaft 105 and the output shaft 15 are integrally rotated.

In the present embodiment, the angle $\theta 1$ which is the change point at which the output shaft signals Sg1 and Sg2 change is set between the first valley section 221 and the first ridge section 226. That is, when the detent plate 21 is rotated in the first direction from the state in which the detent roller 26 is fitted in the first valley section 221 corresponding to the P range, the motor shaft 105 is in contact with the speed reducer 14 at one end side of the rattle width $\theta g$ at the point where the output shaft signals Sg1 and Sg2 first change. The encoder count value $\theta en$ at this time is stored in the first storage unit 61 as a first change point value $\theta enL$.

When the target shift range is switched from the D range to a range other than the D range as indicated by the arrow A2, the detent roller 26 moves from the fourth valley section 224 to the third ridge section 228 by the rotation of the detent plate 21. When the detent roller 26 passes through the center of the fourth valley section 224 and is in a so-called hill climbing state, the motor shaft 105 and the output shaft 15 are integrally rotated.

In the present embodiment, the angle $\theta 3$ which is the change point at which the output shaft signals Sg1 and Sg2 change is set between the third ridge section 228 and the fourth valley section 224. That is, when the detent plate 21 is rotated in the second direction from the state in which the detent roller 26 is fitted in the fourth valley section 224, the motor shaft 105 is in contact with the speed reducer 14 at the other end side of the rattle width $\theta g$ at the point where the output shaft signals Sg1 and Sg2 first change. The encoder count value $\theta en$ at this time is stored in the first storage unit 61 as a second change point value $\theta enR$.

An angle between the angle $\theta 1$ which is the first change point and the angle $\theta 3$ which is the second change point is stored in the second storage unit 62 as the angle design value K1. Therefore, the rattle width $\theta g$ can be calculated based on the first change point value $\theta enL$, the second change point value $\theta enR$ and the designed angle value K1 (refer to equation (1)).

$$\theta g = \{K1 - (\theta enR - \theta enL)\} \qquad (1)$$

An angle design value K2 between the angle $\theta 1$ which is the first change point and the center of the first valley section 221 is stored in advance. Therefore, based on the first change point value $\theta enL$, the angle design value K2 and the learned rattle width $\theta g$, the P-range center count value $\theta p$ can be calculated (refer to equation (2)). This P range center count value $\theta p$ is the encoder count value outputted at the time when the detent roller 26 is fitted in the first valley section 221 and positioned in the center of the rattle width $\theta g$. Hereinafter, as appropriate, the state where the motor shaft 105 is positioned at the center of the rattle width $\theta g$ when the detent roller 26 is fitted to the center of the valley section 221 to 224 is referred to as that the motor 10 is positioned at the center of the valley section 221 to 224.

Further, since the angles between the centers of the valley sections 221 to 224 are stored as the designed angle values Kr, Kn and Kd, the R range center count value $\theta r$, the N range center count value $\theta n$ and the D range center count value $\theta d$ of the encoder count values when the motor 10 is positioned at the centers of the valley sections 222, 223 and 224 can be calculated also (refer to equations (3) to (5)).

$$\theta p = \theta enL - K2 - (\theta g/2) \qquad (2)$$

$$\theta r = \theta enL - K2 - (\theta g/2) + Kr \qquad (3)$$

$$\theta n = \theta enL - K2 - (\theta g/2) + Kr + Kn \qquad (4)$$

$$\theta d = \theta enL - K2 - (\theta g/2) + Kr + Kn + Kd \qquad (5)$$

By setting the center count values $\theta p$, $\theta r$, $\theta n$ and $\theta d$ corresponding to the target shift ranges as the target count values $\theta cmd$ and controlling the motor 10 so that the encoder count value $\theta en$ becomes the target count value $\theta cmd$, the motor 10 can be stopped at the centers of the valley sections 221 to 224. As far as the motor 10 is stopped at the center of the valley section 221 to 224, the detent roller 26 can be fitted properly in the valley section 221 to 224 corresponding to the target shift range by the spring force of the detent spring 25 without being affected by the cogging torque.

Figure 4:
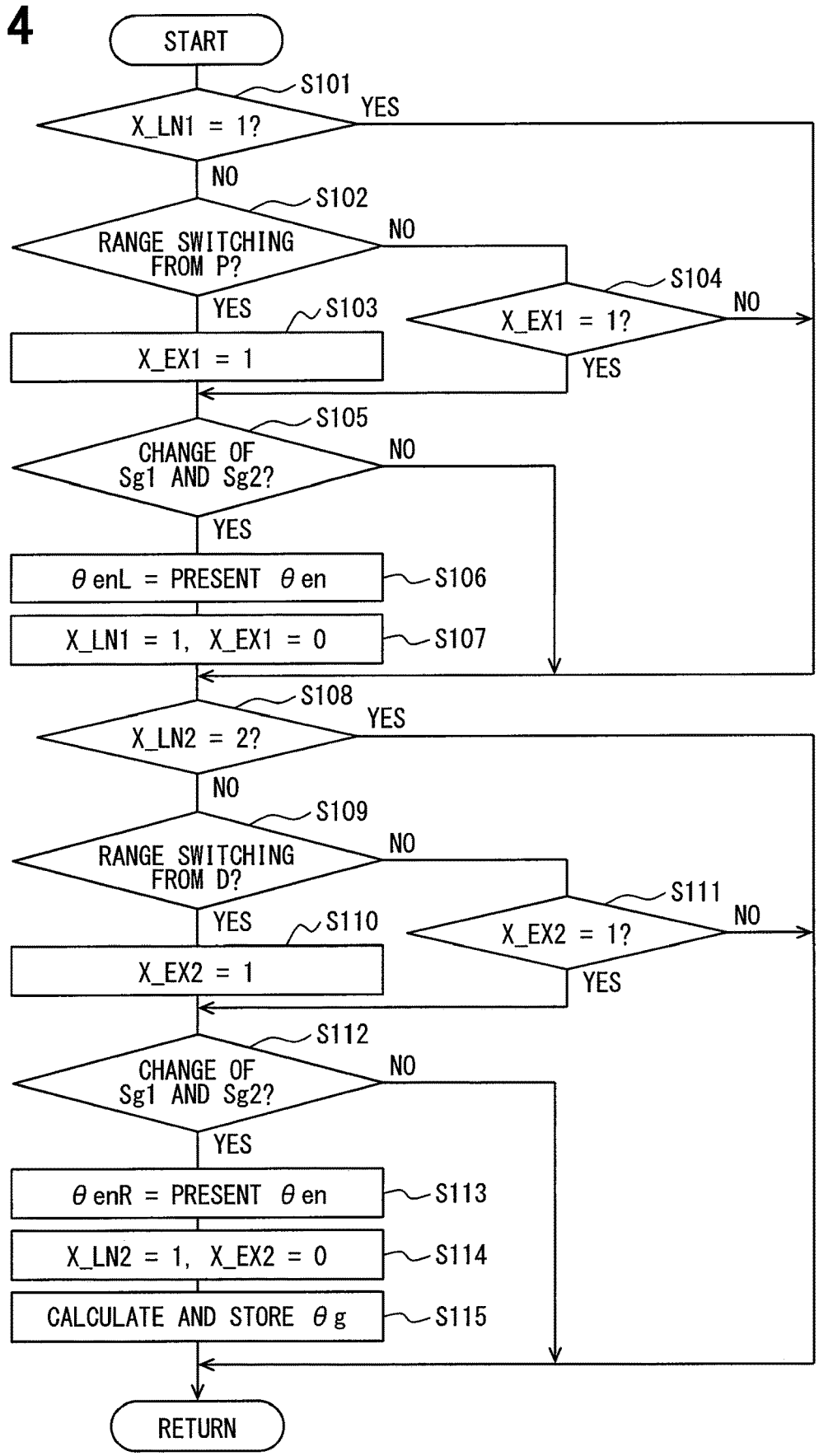
FIG. 4 is a flowchart showing learning processing according to the embodiment.

Here, the learning processing of the rattle width θg will be described with reference to a flowchart of FIG. 4. This processing is executed by the microcomputer, which operates functionally as the learning unit 52, at a predetermined cycle interval when the start switch is turned on. Hereinafter, each "step" in the figures is simply indicated as a symbol "S." In first step S101, the learning unit 52 checks whether a first learning completion flag X_LN1 has been set. In the figure, a state where the flag is set is assumed to be "1," and a state where it is not set is assumed to be "0." The first learning completion flag X_LN1 is set when the first change point value θenL is stored in the first storage unit 61. The first storage unit 61 is a volatile memory. When the start switch is turned off, the first change point value θenL is erased and the first learning completion flag X_LN1 is reset. In case it is determined that the first learning completion flag X_LN1 is set (S101: YES), the processing proceeds to S108. In case it is determined that the first learning completion flag X_LN1 is not set (S101: NO), the processing proceeds to S102.

In S102, the learning unit 52 checks whether the target shift range has been switched from the P range to a range other than the P range. Here, in case that the target shift range in the previous processing is the P range and the target shift range in the present processing is other than the P range, an affirmative determination is made. In other cases, a negative determination is made. In case it is determined that the target shift range has been switched from the P range to the range other than the P range (S102: YES), the processing proceeds to S103 and a first learning execution flag X_EX1 is set. The first learning execution flag X_EX1 indicates that learning of the first change point value θenL is in progress. In case it is determined that the target shift range has not changed (S102: NO), the processing proceeds to S104.

In S104, the learning unit 52 checks whether the first learning execution flag X_EX1 is set. In case it is determined that the first learning execution flag X_EX1 is not set (S104: NO), the processing proceeds to S108. In case it is determined that the first learning execution flag X_EX1 is set (S104: YES), the processing proceeds to S105.

In S105, the learning unit 52 checks whether the output shaft signals Sg1 and Sg2 have changed from the value V1 to the value V2. In case it is determined that the output shaft signals Sg1 and Sg2 have not changed from the value V1 (S105: NO), the processing proceeds to S108. In case it is determined that the output shaft signals Sg1 and Sg2 have changed from the value V1 to the value V2 (S105: YES), the processing proceeds to S106.

In S106, the learning unit 52 stores the present encoder count value θen in the first storage unit 61 as the first change point value θenL. In S107, the learning unit 52 sets the first learning completion flag X_LN1 and resets the first learning execution flag X_EX1.

In S108, the learning unit 52 checks whether a second learning completion flag X_LN2 is set. The second learning completion flag X_LN2 is set when the rattle width θg is stored in the second storage unit 62. The second learning completion flag X_LN2 is not reset even when the start switch is turned off, once the learning of the rattle width θg has been completed. Further, the second learning completion flag X_LN2 is reset when the rattling width θg is erased by the removal of the battery, the occurrence of battery rundown or the like. Furthermore, the second learning completion flag X_LN2 is reset when switching on and off of the start switch is made a predetermined number of times (for example, several thousand times) after the previous learning of the rattle width θg, and the rattle width θg is learned again. In case it is determined that the second learning completion flag X_LN2 is set (S108: YES), this routine is finished without executing processing S109 and subsequent steps. In case it is determined that the second learning completion flag X_LN2 is not set (S108: NO), the processing proceeds to S109.

In S109, the learning unit 52 checks whether the target shift range has been switched from the D range to a range other than the D range. Here, in case that the target shift range in the previous processing is the D range and the target shift range in the present processing is other than the D range, an affirmative determination is made. In other cases, a negative determination is made and the processing proceeds to S111. In case it is determined that the target shift range has been switched from the D range to the range other than the D range (S109: YES), the processing proceeds to S110 and a second learning execution flag X_EX2 is set. The second learning execution flag X_EX2 is a flag which indicates that learning of the second change point value θenR is in progress.

In S111, the learning unit 52 checks whether the second learning execution flag X_EX2 is set. In case it is determined that the second learning execution flag X_EX2 is not set (S111: NO), this routine is finished without executing subsequent processing. In case it is determined that the second learning execution flag X_EX2 is set (S111: YES), the processing proceeds to S112.

In S112, the learning unit 52 checks whether the output shaft signals Sg1 and Sg2 have changed from the value V4 to the value V3. In case it is determined that the output shaft signals Sg1 and Sg2 are the value V4 (S112: NO), this routine is finished without executing the processing of S113 and subsequent steps. In case it is determined that the output shaft signals Sg1 and Sg2 have changed from the value V4 to the value V3 (S112: YES), the processing proceeds to S113.

In S113, the learning unit 52 sets the present encoder count value θen as the second change point value θenR. In S114, the learning unit 52 sets the second learning completion flag X_LN2 and resets the second learning execution flag X_EX2. In S115, the learning unit 52 calculates the rattle width θg based on the equation (1), and stores the calculated rattle width θg in the second storage unit 62.

Figure 5:
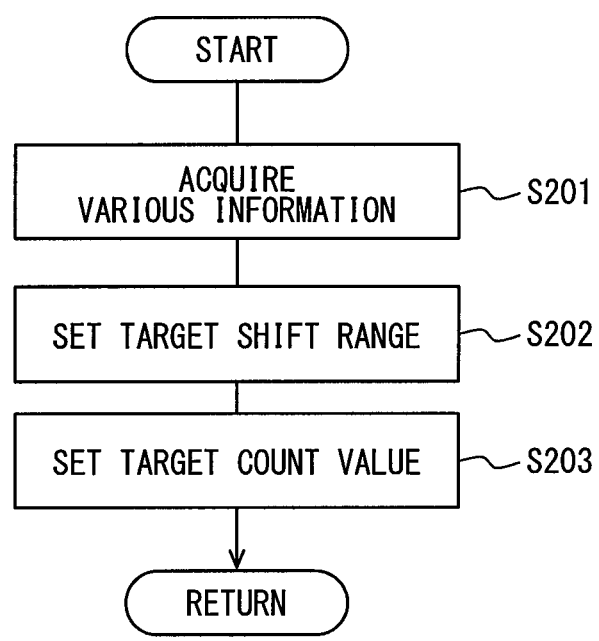
FIG. 5 is a flowchart showing target angle setting processing according to the embodiment.

Target angle setting processing will be described with reference to a flowchart of FIG. 5. This processing is executed by the target angle setting unit 55 at a predetermined interval. In S201, the target angle setting unit 55 acquires the driver-requested shift range, which is input from the shift switch or the like, the vehicle speed, the brake signal and the like. In S202, the target angle setting unit 55 sets a target shift range based on the driver-requested shift range, the vehicle speed, the brake signal and the like.

In S203, the target angle setting unit 55 sets the target count value θcmd based on the equations (2) to (5) according to the target shift range. Alternatively, the center count values θp, θr, θn and θd may be calculated and stored in the first storage unit 61 or the like in advance after calculation of the rattle width θg, and the stored values may be retrieved later.

As described above, the shift range control device 40 switches the shift range of the vehicle by controlling the drive of the motor 10 in the shift-by-wire system 1. The shift-by-wire system 1 includes the motor 10, the detent plate 21, the detent roller 26, the encoder 13 and the output shaft sensor 16. The detent plate 21 is formed with a plurality of valley sections 221 to 224 and a plurality of ridge sections 226 to 228 between the valley sections 221 to 224 and rotates integrally with the output shaft 15 to which the rotation of the motor 10 is transmitted. The detent roller 26 is engageable with the valley sections 221 to 224 according to the shift ranges. The encoder 13 outputs the motor rotation angle signal SgE according to the rotation position of the motor 10. The output shaft sensor 16 outputs the output shaft signals Sg1 and Sg2 corresponding to the rotation position of the output shaft 15.

The shift range control device 40 includes the angle calculation unit 51, the target angle setting unit 55, the learning unit 52 and the drive control unit 56. The angle calculation unit 51 calculates the encoder count value $\theta$en based on the motor rotation angle signal SgE. The target angle setting unit 55 sets the target count value $\theta$cmd corresponding to the target shift range. The learning unit 52 learns the rattle width $\theta$g, which is the correction value used to calculate the target count value $\theta$cmd, based on the encoder count value $\theta$en and the output shaft signals Sg1 and Sg2. The drive control unit 56 controls the drive of the motor 10 such that the encoder count value $\theta$en becomes the target count value $\theta$cmd.

The output shaft signals Sg1 and Sg2 change stepwise so as to have different values before and after movement when the detent roller 26 moves from the state of being fitted to the valley section 221 to 224 to the adjacent valley section. Here, the rotation direction of the detent plate 21 at the time of switching from the P range to the range other than the P range is assumed to be the first direction, and the rotation direction opposite to the first direction is assumed to be the second direction. The first direction and the second direction simply define the direction of rotation. The detent plate 21 is assumed to rotate in the first direction even in case that the detent plate 21 is rotated from the range other than the P range, for example, in case of switching from the R range to the D range.

The learning unit 52 learns the rattle width $\theta$g based on at least the first change point value $\theta$enL, which is the encoder count value $\theta$en at the timing at which the output shaft signals Sg1 and Sg2 change when the detent plate 21 rotates in the first direction from the state in which the detent roller 26 is in the center of the valley section 221 to 223, and/or the second change point value $\theta$enR, which is the encoder count value $\theta$en at the timing at which the output shaft signals Sg1 and Sg2 change when the detent plate 21 rotates in the second direction from the state in which the detent roller 26 is in the center of the valley section 222 to 224.

In the present embodiment, the learning unit 52 learns the rattle width $\theta$g based on the first change point value $\theta$enL, which is the encoder count value $\theta$en at the timing at which the output shaft signals Sg1 and Sg2 change when the detent plate 21 rotates in the first direction from the state in which the detent roller 26 is in the center of the first valley section 221, and the second change point value $\theta$enR, which is the encoder count value $\theta$en at the timing at which the output shaft signals Sg1 and Sg2 change when the detent plate 21 rotates in the second direction from the state in which the detent roller 26 is in the center of the fourth valley section 224. Further, the correction value of the present embodiment is a value corresponding to the total of the plays between the motor shaft 105 and the output shaft 15.

In the present embodiment, the output shaft signals Sg1 and Sg2 change stepwise in correspondence to the shift range. In addition, the rattle width $\theta$g is calculated based on the first change point value $\theta$enL and the second change point value $\theta$enR, which are the encoder count values $\theta$en at the timing of the change in the output shaft signals Sg1 and Sg2 when the detent plate 21 is rotating in the first direction and when it is rotating in the second direction. Then, by setting the target count value $\theta$cmd using the calculated rattle width $\theta$g, the motor 10 can be driven to attain the center of the valley section 221 to 224 irrespective of at which position in the rattle range the motor shaft 105 is when driving of the motor 10 is started. Thereby, even in case that the cogging torque is generated in the motor 10, positioning control of the motor 10 can be performed with high accuracy so that the detent roller 26 fits properly in the valley section 221 to 224 corresponding to the target shift range. In case that an output shaft sensor which changes its output value stepwise is used, the detection accuracy becomes lower than a sensor which changes its output value linearly. In case that such an output shaft sensor is used, the control accuracy of the motor is lowered. In case that a motor such as a DC brushless motor which generates cogging torque is used, for example, there arises a possibility that an engagement section cannot be properly fitted into a recessed section corresponding to a target range because of the cogging torque.

The output shaft signals Sg1 and Sg2 change the values when the detent roller 26 is between the center of the first valley section 221 which is the P range side valley section of the first ridge section 226 and the top of the first peak section 226. The first change point value $\theta$enL is the encoder count value $\theta$en at the timing when the value of the output shaft signal changes during the movement of the detent roller 26 from the first valley section 221 toward the top of the first ridge section 226. The output shaft signals Sg1 and Sg2 change the values when the detent roller 26 is between the center of the fourth valley section 224, which is opposite to the P range side valley section of the third ridge section 228, and the third ridge section 228. The second change point value $\theta$enR is the encoder count value $\theta$en at the timing when the values of the output shaft signals Sg1 and Sg2 change during the movement of the detent roller 26 from the fourth valley section 224 toward the third ridge section 228.

When the rotation direction of the detent plate 21 is the first direction and the detent roller 26 is between the center of the first valley section 221 and the top of the first ridge section 226, the motor shaft 105 and the output shaft 15 are integrally rotated with the detent roller 26 which is pushed to keep contacting the detent plate 21 in the moving direction. When the rotation direction of the detent plate 21 is the second direction and the detent roller 26 is between the center of the fourth valley section 224 and the top of the third ridge section 228, the motor shaft 105 and the output shaft 15 are integrally rotated with the detent roller 26 which is pushed to keep contacting the detent plate 21 in the moving direction. Therefore, by using the encoder count values $\theta$en determined when the motor shaft 105 and the output shaft 15 rotate integrally, it is possible to learn the rattle width $\theta$g properly.

The rattle width $\theta$g is stored in the second storage unit 62, which is the storage unit that holds information even when the start switch of the vehicle is turned off. The learning unit 52 learns the first change point value $\theta$enL each time the start switch is turned on. Further, the learning unit 52 learns the second change point value $\theta$enR when the information related to the rattle width $\theta$g is not stored in the second storage unit 62.

Even in case that the value of the encoder 13 is reset at the time of turning off of the start switch, the target count value θcmd can be set properly by learning the first change point value θenL each time the start switch is turned on. In addition, by storing the information in the second storage unit 62 that holds the information even when the start switch is turned off, it is possible to omit the learning related to the second change point value θenR as long as the rattle width θg is kept stored, The learning unit 52 learns again the second change point value θenR, when the start switch is switched on and off the predetermined number of times from learning of the second change point value θenR. Thereby, the rattle width θg can be properly set again in correspondence to the change with time.

In summary, according to the embodiment described above, a shift range control device calculates a motor angle based on a motor rotation angle signal, sets a motor angle target value corresponding to a target shift range, learns a correction value to be used in calculating a motor angle target value based on a motor angle and an output shaft signal, and controls driving of a motor such that the motor angle attains the motor angle target value.

The output shaft signal changes stepwise to different values between before and after moving when an engagement member moves from a state in which the engagement member is fitted in one valley section to an adjacent valley section. A rotation direction of a rotation member at the time of switching from a P range to a range other than the P range is assumed to be a first direction and a rotation direction opposite to the first direction is assumed to be a second direction. The shift range control device learns the correction value based on at least a first change point value, which is the motor angle at a timing at which the output shaft signal changes when the rotation member rotates in the first direction from a state in which the engagement member is in a center of the valley section, and/or a second change point value, which is the motor angle at a timing at which the output shaft signal changes when the rotation member rotates in the second direction from a state in which the engagement member is in the center of the valley section.

The correction value is calculated based on at least either one of the first change point value and the second change point value, which is the motor angle at a timing at which the output shaft signal changes in either case of rotation of the rotation member in the first direction or in the second direction. By setting the motor angle target value based on the calculated correction value, it is made possible to control positioning of the motor with high accuracy so that the engagement member is properly fitted in the valley section corresponding to a target shift range even when cogging torque is generated in the motor.

Other Embodiment

In the embodiment described above, the learning unit learns the rattle width, which is the correction value, based on the first change point value and the second change point value. In another embodiment, the learning unit may omit either one of learning of the first change point value or the second change point value by using, for example, a design value.

In the embodiment described above, the first change point value is learned at the time of switching from the P range to the range other than the P range. In another embodiment, the value of the output shaft signal may be changed when the detent roller 26 is between the center of the second valley section 222 and the top of the second ridge section 227, and the motor angle at the change timing, at which the shift range is switched from the R range to the N range or the D range, may be set as the first change point value. Further, the value of the output shaft signal may be changed when the detent roller 26 is between the center of the third valley section 223 and the top of the third ridge section 228, and the motor angle at the change timing, at which the shift range is switched from the N range to the D range, may be set as the first change point value.

In the embodiment described above, the second change point value is learned at the time of switching from the D range to the range other than the D range. In another embodiment, the value of the output shaft signal may be changed when the detent roller 26 is between the third valley section 223 and the top of the second ridge section 227, and the motor angle at this change timing, at which the shift range is switched from the N range to the R range or the P range, may be set as the second change point value. Further, the value of the output shaft signal may be changed when the detent roller 26 is between the second valley section 222 and the top of the first ridge section 226, and the motor angle at the change timing, at which the shift range is switched from the R range to the P range, may be set as second change point value. In another embodiment, the output shaft signal may be changed between the centers of a plurality of P range side valley sections and the top of the ridge sections. In addition, the output shaft signal may be changed between the centers of the valley sections, which are at the opposite side to the P range, and the ridge sections.

In the embodiment described above, the angle θ1 at which the output shaft signal changes is set in the same manner as the P lock guarantee range. In another embodiment, the angle θ1 at which the output shaft signal changes may be different from the P lock guarantee range. Further, the angle θ1 at which the output shaft signal changes is set in the same manner as the D hydraulic pressure guarantee range. In another embodiment, the angle θ3 at which the output shaft signal changes may be different from the D lock guarantee range.

In the embodiment described above, the second change point value and the rattle width are learned when the rattle width is not stored in the storage unit and when the start switch has been switched on and off the predetermined number of times after the previous learning. In another embodiment, the number of times of learning of the second change point value and the rattle width is not limited to the case described above but may be executed each time the start switch is turned on, for example, similarly to the first change point value.

In the embodiment described above, the correction value is the rattle width corresponding to the sum of the plays between the motor shaft and the output shaft. In another embodiment, the correction value may be any value capable of computing the rattle width, for example, a value which corresponds to a distance from a center of rattle to an end position of the rattle, that is, (θg/2) or the like. The correction value may be the first change point value and the second change point value themselves. The target rotation position is calculated by an arithmetic equation corresponding to the correction value.

In the embodiment described above, the motor is the DC brushless motor. In another embodiment, the motor may be any motor, such as, for example, a switched reluctance motor. In the embodiment described above, although the number of winding sets of the motor is not referred to, the number of winding sets may be one or plural. In the above embodiment, the motor rotation angle sensor is an encoder.

In another embodiment, the rotation angle sensor need not necessarily be the encoder but may be any other devices such as a resolver or the like. That is, the motor angle is not limited to the encoder count value but may be any value that can be converted into the motor angle.

In the embodiment described above, an MR sensor is used as the output shaft sensor. In another embodiment, a magnetic sensor other than the MR sensor may be used. Moreover, in the embodiment described above, a double system is formed such that two independent output shaft signals are output from the output shaft sensor. In another embodiment, the number of output shaft signals output from the output shaft sensor may be one or three or more. That is, the output shaft sensor may be a single system type or a triple or more multiplex system type. The motor rotation angle sensor may be a multiple system.

In the embodiment described above, the rotation member is the detent plate, and the engagement member is the detent roller. In another embodiment, the rotation member and the engagement member are not limited to the detent plate and the detent roller, but may be any other type in regard to a shape and the like. In the embodiment described above, the detent plate is provided with four valley sections. In another embodiment, the number of the valley sections is not limited to four but may be any number. For example, the number of valley sections of the detent plate may be two so that the P range and the notP range may be switched. In the embodiment described above, the number of engagement positions matches the number of steps of the output shaft signal. In another embodiment, the number of engagement positions and the number of steps of the output shaft signal may be different. For example, the values of the output shaft signal of the same ridge section may be switched between the valley section on the P range side and the valley section on the NotP range valley section side. The shift range switching mechanism and the parking lock mechanism and the like may be different from those of the embodiment described above.

In the embodiment described above, the speed reducer is placed between the motor shaft and the output shaft. Although the details of the speed reducer are not described in the embodiment described above, it may be configured by using, for example, a cycloid gear, a planetary gear, a spur gear that transmits torque from a reduction mechanism substantially coaxial with the motor shaft to a drive shaft, or any combination of these gears. In another embodiment, the speed reducer between the motor shaft and the output shaft may be omitted, or a mechanism other than the speed reducer may be provided. The present disclosure is not limited to the embodiment described above but various modifications may be made within the scope of the present disclosure.

The present disclosure has been made in accordance with the embodiment. However, the present disclosure is not limited to such an embodiment and structures. That is, this disclosure also encompasses various modifications and variations within the scope of equivalents. Furthermore, various combination and formation, and other combination and formation including one, more than one or less than one element may be made in the present disclosure.

What is claimed is:

1. A shift range control device for switching a shift range by controlling driving of a motor in a shift range switching system, which includes:
a motor;
a rotation member having plural valley sections and plural ridge sections formed between the valley sections and rotatable integrally with an output shaft to which rotation of the motor is transmitted;
an engagement member engageable with the valley section corresponding to a shift range;
a motor rotation angle sensor for outputting a motor rotation angle signal corresponding to a rotation position of the motor; and
an output shaft sensor for outputting an output shaft signal corresponding to a rotation position of the output shaft,
the shift range control device comprising:
an angle calculation unit for calculating a motor angle based on the motor rotation angle signal;
a target angle setting unit for setting a motor angle target value corresponding to a target shift range;
a learning unit for learning a correction value to be used in calculating the motor angle target value based on the motor angle and the output shaft signal; and
a drive control unit for controlling driving of the motor so that the motor angle attains the motor angle target value, wherein
assuming that a rotation direction of the rotation member at the time of switching from a P range to a range other than the P range is a first direction and a rotation direction opposite to the first direction is a second direction,
the output shaft signal changes to different values stepwise between before and after moving when the engagement member moves from a state in which the engagement member is fitted in one valley section to an adjacent valley section; and
the learning unit learns the correction value based on at least a first change point value, which is the motor angle at a timing at which the output shaft signal changes when the rotation member rotates in the first direction from a state in which the engagement member is in a center of the valley section, and/or a second change point value, which is the motor angle at a timing at which the output shaft signal changes when the rotation member rotates in the second direction from a state in which the engagement member is in a center of the valley section.

2. The shift range control device according to claim 1, wherein:
assuming that the valley section which is at a P range side of the ridge section is a P range side valley section,
the output shaft signal changes a value thereof at least one position when the engagement member is between a center of the P range side valley section and a top point of the ridge section; and
the first change point value is the motor angle at the timing of a change of the value of the output shaft signal when the engagement member moves from the P range side valley section toward the peak point of the ridge section.

3. The shift range control device according to claim 1, wherein:
assuming that the valley section which is at an opposite side to the P range of the ridge section is a valley section at an opposite side to the P range,
the output shaft signal changes a value thereof at least at one position when the engagement member is between a center of the valley section at an opposite side to the P range and a top point of the ridge section; and
the second change point value is the motor angle at the timing of a change of the value of the output shaft signal when the engagement member moves from the counter P range side valley section toward the top point of the ridge section.

4. The shift range control device according to claim 1, wherein:
the correction value is stored in a storage unit, which maintains information therein even in case of turning off of a start switch of a vehicle;
the learning unit learns the first change point value each time the start switch is turned on; and
the learning unit learns the second change point value when no information related to the correction value is stored in the storage unit.

5. The shift range control device according to claim 4, wherein:
the learning unit learns the second change point value again when the start switch is turned on and off a predetermined number of times after previous learning of the second change point value.

6. A shift range control device for switching a shift range by controlling driving of a motor in a shift range switching system, which includes:
a motor;
a rotation member having plural valley sections and plural ridge sections formed between the valley sections and rotatable integrally with an output shaft to which rotation of the motor is transmitted;
an engagement member engageable with the valley section corresponding to a shift range;
a motor rotation angle sensor for outputting a motor rotation angle signal corresponding to a rotation position of the motor; and
an output shaft sensor for outputting an output shaft signal corresponding to a rotation position of the output shaft,
the shift range control device comprising a microcomputer, which has a memory and programmed to execute processing of:
calculating a motor angle based on the motor rotation angle signal;
setting a motor angle target value corresponding to a target shift range;
learning a correction value to be used in calculating the motor angle target value based on the motor angle and the output shaft signal; and
controlling driving of the motor so that the motor angle attains the motor angle target value, wherein
assuming that a rotation direction of the rotation member at the time of switching from a P range to a range other than the P range is a first direction and a rotation direction opposite to the first direction is a second direction,
the output shaft signal changes to different values stepwise between before and after moving when the engagement member moves from a state in which the engagement member is fitted in one valley section to an adjacent valley section; and
the correction value is learned by the processing of learning based on at least a first change point value, which is the motor angle at a timing at which the output shaft signal changes when the rotation member rotates in the first direction from a state in which the engagement member is in a center of the valley section, and/or a second change point value, which is the motor angle at a timing at which the output shaft signal changes when the rotation member rotates in the second direction from a state in which the engagement member is in a center of the valley section.

7. The shift range control device according to claim 6, wherein:
assuming that the valley section which is at a P range side of the ridge section is a P range side valley section,
the output shaft signal changes a value thereof at least one position when the engagement member is between a center of the P range side valley section and a top point of the ridge section; and
the first change point value is the motor angle at the timing of a change of the value of the output shaft signal when the engagement member moves from the P range side valley section toward the peak point of the ridge section.

8. The shift range control device according to claim 7, wherein:
assuming that the valley section which is at an opposite side to the P range of the ridge section is a valley section at an opposite side to the P range,
the output shaft signal changes a value thereof at least at one position when the engagement member is between a center of the valley section at an opposite side to the P range and a top point of the ridge section; and
the second change point value is the motor angle at the timing of a change of the value of the output shaft signal when the engagement member moves from the counter P range side valley section toward the top point of the ridge section.

9. The shift range control device according to claim 8, wherein:
the correction value is stored in a storage unit, which maintains information therein even in case of turning off of a start switch of a vehicle;
the first change point value is learned by the processing of learning each time the start switch is turned on; and
the second change point value is learned by the processing of learning when no information related to the correction value is stored in the storage unit.

10. The shift range control device according to claim 9, wherein:
the second change point value is learned again by the processing of learning when the start switch is turned on and off a predetermined number of times after previous learning of the second change point value.

* * * * *